United States Patent
Liu et al.

(10) Patent No.: US 12,505,307 B2
(45) Date of Patent: Dec. 23, 2025

(54) NATURAL LANGUAGE TRAINING AND/OR AUGMENTATION WITH LARGE LANGUAGE MODELS

(71) Applicant: MICROSOFT TECHNOLOGY LICENSING, LLC, Redmond, WA (US)

(72) Inventors: Yang Liu, Bellevue, WA (US); Yichong Xu, Bellevue, WA (US); Dan Iter, Austin, TX (US); Chenguang Zhu, Bellevue, WA (US); Nanshan Zeng, Bellevue, WA (US); Shuohang Wang, Belevue, WA (US); Hiteshi Sharma, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 200 days.

(21) Appl. No.: 18/133,938

(22) Filed: Apr. 12, 2023

(65) Prior Publication Data

US 2024/0346254 A1 Oct. 17, 2024

(51) Int. Cl.
*G06F 40/40* (2020.01)
*G06F 40/186* (2020.01)
(Continued)

(52) U.S. Cl.
CPC ............ *G06F 40/40* (2020.01); *G06F 40/186* (2020.01); *G06F 40/20* (2020.01); *G06F 40/35* (2020.01); *G06N 20/00* (2019.01)

(58) Field of Classification Search
CPC ........ G06F 40/40; G06F 40/186; G06F 40/20; G06F 40/35; G06F 16/3329; G06F 16/90332; G06N 20/00
See application file for complete search history.

(56) References Cited

U.S. PATENT DOCUMENTS 11,095,579 B1 * 8/2021 de Mazancourt ....... G06F 40/40
2010/0217582 A1 * 8/2010 Waibel .................... G10L 15/22
704/7
(Continued)

FOREIGN PATENT DOCUMENTS

CN 114443819 A * 5/2022 ......... G06F 16/3344

OTHER PUBLICATIONS

CN114443819A-MT (Year: 2022).*
(Continued)

*Primary Examiner* — Darioush Agahi
(74) *Attorney, Agent, or Firm* — Newport IP, LLC; Jacob P. Rohwer

(57) ABSTRACT

The techniques described herein enhance the operations of natural language generation systems through training and/or augmentation by a large language model. In a first example, the large language model can execute training operations by processing a training dataset to produce a natural language output. The natural language generation system can analyze the training dataset and the natural language output to generate a natural language output mimicking the output of the large language model. The large language model can then evaluate the output of the natural language generation system to iteratively adjust and improve the quality of natural language outputs. In a second example, the large language can augment a small language model in executing natural language tasks. This is accomplished by retrieving external information using the large language model to generate an augmentation input to provide context and a language framework to the small language model to enhance overall outputs.

19 Claims, 8 Drawing Sheets

(51) Int. Cl.
    *G06F 40/20*     (2020.01)
    *G06F 40/35*     (2020.01)
    *G06N 20/00*     (2019.01)

(56) References Cited

U.S. PATENT DOCUMENTS

| | | | |
|---|---|---|---|
| 2024/0185001 A1* | 6/2024 | Nagaraju | G06F 40/284 |
| 2024/0281472 A1* | 8/2024 | LaRhette | G06F 16/248 |
| 2024/0311617 A1* | 9/2024 | Di Palo | G06V 10/82 |
| 2025/0029170 A1* | 1/2025 | Chachek | H04W 4/024 |

OTHER PUBLICATIONS

International Search Report Received in PCT Application No. PCT/US2024/032139, (MS# 412773-PCT01) mailed on Oct. 2, 2024, 05 pages.
International Preliminary Report on Patentability (Chapter I) received for PCT Application No. PCT/US2024/032139, Oct. 23, 2025, 10 pages.

* cited by examiner

NATURAL LANGUAGE TRAINING AND/OR AUGMENTATION WITH LARGE LANGUAGE MODELS

BACKGROUND

Recent years have seen the rapid growth in the capability and sophistication of artificial intelligence (AI) and machine learning (ML) software applications. For instance, transformer-based large language models (LLMs) have seen widespread adoption due to their diverse processing capabilities in vision, speech, language, and decision making. Unlike other AI models, such as recurrent neural networks and long short-term memory (LSTM) models, transformer-based large language models make use of a native self-attention mechanism to identify vague context from limited available data and even synthesize new content from images and music to software. Commensurate with their capabilities, large language models are complex, oftentimes comprising millions if not billions of individual parameters. Accordingly, various organizations deploy large-scale computing infrastructure, such as cloud computing, to offer AI platforms tailored to enabling user access to cutting-edge large language models.

The ability of large language models to identify and work within vague or indefinite contexts allows large language models to achieve high quality natural language outputs (e.g., text). This ability can be leveraged in various scenarios such as text summarization where an understanding of context and fluency in a natural language (e.g., English) is important. Moreover, large language models can ingest large amounts of training data and maintain learnings across diverse application spaces. That is, information, techniques, and other training data can be learned once and applied endlessly when relevant.

However, large language models can also incur technical costs that may be detrimental in various usage scenarios. For instance, a provider may wish to deploy a large language model in a specific natural language domain (e.g., records management). Unfortunately, due to the high complexity of large language models, deploying a large language model in such a specific context can be impractical. For example, training and adapting the large language model to the specific domain can be inordinately time consuming and resource intensive.

SUMMARY

The techniques described herein provide systems for enhancing natural language generation (NLG) systems through large language model training and/or augmentation. As mentioned above, the ability of large language models (LLMs) to identify vague contexts from input data allows large language models to mimic human intuition and specific domain knowledge. However, adapting and deploying a large language model in a specific domain can also be impractical due to the complexity of large language models leading to excessive resource consumption and limited performance. In contrast, small language models (SMLs), while lacking the same contextual intelligence of large language models, can express comparatively lower resource consumption enabling greater agility and adaptability. As such, the disclosed techniques can utilize large language models to train and/or augment small language models to leverage the benefits of both.

In one example, a large language model can be configured for automated training of a natural language generation system through imitation learning and reinforcement learning. The large language model can receive a dataset comprising a large corpus of unlabeled data such as research publications and conference presentations. In addition, the large language model can receive a natural language generation task (e.g., summarization, query and answer, annotation) which can be formatted as a prompt. In response, the large language model can produce a first natural language output which can serve as a pseudo-label for the dataset. Stated another way, the dataset can be configured by the large language model for training the natural language generation system.

In contrast, traditional training methodologies typically rely on manually labeled training data. Consequently, typical systems can experience limitations on available training data and/or increased costs associated with obtaining manually labeled training data. By labeling the dataset using the large language model, the disclosed system can bypass such costs to streamline the training process thereby improving overall efficiency of the system.

The natural language generation system can subsequently process the dataset along with the first natural language output using an imitation learning protocol. In various examples, the imitation learning protocol can cause the natural language generation system to emulate the behaviors of the large language model when presented with various natural language tasks. For instance, the natural language generation system can learn characteristics of the large language model in the context of a text summarization task. Accordingly, the natural language generation system can apply these behaviors upon encountering a text summarization task to produce a natural language output.

The natural language output produced by the natural language generation system can then be provided to the large language model for evaluation. The large language model can utilize various scoring criteria such as an informativeness parameter, a fluency parameter, and/or a coherence parameter to calculate an output score as well as various feedback inputs. The output score can serve to quantify the quality of the natural language output of the natural language generation system. The natural language generation system can accordingly be configured with a reinforcement learning protocol wherein the objective of the reinforcement learning protocol is to increase the output score overtime. Likewise, the feedback inputs can define various modifications to the natural language generation system to improve the quality of the natural language output (e.g., improve fluency). Over the course of many iterations, the natural language generation system can align with the preferences of the large language model to achieve high performance beyond simply imitating large language model outputs.

As mentioned above, the large language model can bypass the drawbacks of utilizing manually labeled training data by producing first natural language outputs for an input dataset. Similarly, by continuing to utilize the large language model to perform reinforcement learning, the present techniques can further streamline the training process. For instance, typical reinforcement learning systems often utilize human feedback to evaluate and modify models under training. At large scales, collecting human feedback can be costly and impractical which may limit the performance of such systems. In contrast, by constructing a reward model comprising the feedback inputs and the output score, the disclosed system can bypass the need to collect human feedback thereby further enhancing efficiency. Moreover, by taking on the behavior of the large language model, the natural language generation system can match and even exceed the performance of the large language model itself by retaining the reduced resource consumption and adaptability inherent to the smaller size of the natural language generation system.

In another example, a large language model can be deployed to augment a natural language generation system in a live deployment context such as a query and answer system. In this context, the large language model can cooperate with a small language model of the natural language generation system to leverage the strengths of both approaches to produce high quality natural language outputs. As mentioned above, large language models benefit from strong language understanding and language generation capabilities across diverse tasks. However, fine tuning and adapting large language models with their tens of billions of parameters can be impractical and unduly resource intensive. In contrast, a small language model can be agilely fine-tuned and adapted with domain-specific data while suffering from generally inferior language understanding and generation quality relative to a large language model.

Accordingly, the present system can process an input dataset and natural language generation task using both the large language model and the small language model. In addition, the large language model can retrieve external information (e.g., articles, webpages) that are relevant to the input dataset and/or the natural language generation task. The large language model can subsequently produce an augmentation input containing selected information extracted from the external information, queries and responses regarding the external information, an output template for formatting the natural language output.

In a specific example, the natural language generation task can be a summarization task where the input dataset is a body of text to be summarized. Accordingly, the large language model can produce keywords, extract important facts such as people and places and the like to generate an augmentation input. The augmentation input can be subsequently provided along with the input dataset and natural language generation task to the small language model of the natural language generation system. The small language model can utilize the augmentation input as a framework to execute the natural language generation task and produce a natural language output. Moreover, because of the live deployment context of the present system, the natural language generation system can collect feedback from users to further fine-tune the natural language generation system.

By augmenting a small language model with a large language model, the disclosed system can extract the technical benefits of both while addressing the potential shortcomings of utilizing a large language model or a small language model individually. As such, the overall performance of natural language generation systems can benefit from enhanced language understanding and generation via the large language model while maintaining the adaptability and domain-specific strengths of a small language model.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein enhance the operation of natural language generation systems by utilizing a large language model for training and/or augmentation. As mentioned above, despite the strength of large language models in language understanding and generation, the high complexity of large language models can make it impractical to adapt and deploy large language models in specific contexts. Conversely, while small language models boast improved adaptability and resource consumption relative to large language models, small language models can also suffer from generally inferior natural language understanding and generation capabilities.

As such, by utilizing a large language model to perform imitation learning and reinforcement learning for a natural language generation system, the disclosed techniques can enable a natural language generation system to take on the behaviors of the large language model across various natural language generation tasks to improve the quality of natural language outputs. Similarly, the large language model can continue to augment the natural language generation system in a live deployment context. For instance, the large language model can produce augmentation outputs based on an input dataset and natural language generation task to guide a small language model in execution of the natural language generation task. In this way, the natural language generation system can produce high quality natural language outputs while retaining adaptability and resource efficiency of a small language model.

Various examples, scenarios, and aspects that enable natural language training and/or augmentation with large language models are described below with respect to FIGS. 1-8.

Figure 1:
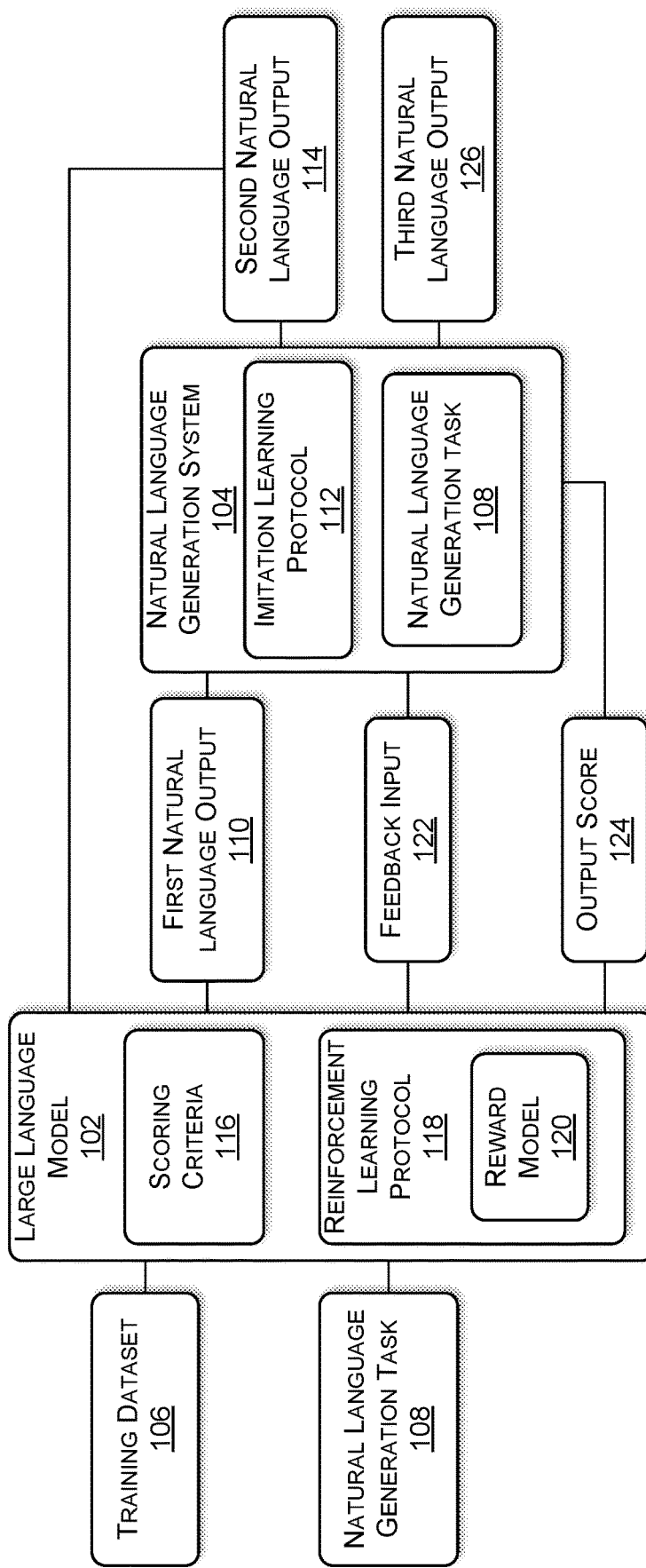
FIG. 1 is a block diagram of a system for performing training of a natural language generation system using a large language model.

FIG. 1 illustrates a system 100 in which a large language model 102 can be configured to train a natural language generation system 104. Examples of the large language model 102 include BLOOM by HUGGING FACE, BERT by GOOGLE, ALEXA™ by AMAZON, GPT-4 by OPENAI, and DEBERTA by MICROSOFT. As shown, the large language model 102 can receive a training dataset 106 as well as a natural language generation task 108. In various examples, the natural language generation task 108 can include text summarization, conversational dialogue generation, query response, text synthesis, and so forth. Furthermore, the natural language generation task 108 can be formatted as a plain language prompt configuring the large language model 102 to execute various behaviors (e.g., "summarize these articles"). Moreover, the training dataset 106 can be a large (e.g., thousands, millions) unlabeled corpus of data such as articles, images, audio, software, and the like. In the present context, unlabeled data can include any content that has not been manually altered and/or formatted (i.e., labeled) for the purposes of training an artificial intelligence (AI) program.

Accordingly, the large language model 102 execute the natural language generation task 108 on the training data set 106 to generate a first natural language output 110. In a specific example, the training dataset 106 can comprise a collection of research publications relating to a certain topic (e.g., anthropology, medical technology, history). Furthermore, the natural language generation task 108 can be a plain language prompt configuring the large language model 102 to "summarize these research publications for an academic audience." Consequently, the first natural language output 110 can be a body of text summarizing important aspects of each of the research publications within the training dataset 106 such as important researchers, institutions, key findings, broad trends, and so forth.

The natural language generation system 104 can then be initialized with the first natural language output 110. In various examples, the natural language generation system 104 can be configured with an imitation learning protocol 112 and the natural language generation task 108. The imitation learning protocol 112 can cause the natural language generation system 104 to analyze the training dataset 106 (e.g., the research publications) in the context of the natural language outputs 110 provided by the large language model 102 to learn a policy that mimics the behavior of the large language model 102. As such, the natural language generation system 104 can execute the natural language generation task 108 to generate a second natural language output 114 that mimics the first natural language output 110.

Generally described, the imitation learning protocol 112 can involve collecting demonstrations from an expert, also known as trajectories. The expert can be a human user demonstrating an expected behavior (e.g., how to drive a car). However, in the examples discussed herein, the expert can be the large language model 102. In some approaches such as behavioral cloning, the trajectories can be broken down into state-action pairs which can then be synthesized into a policy that governs the behavior of the model under training (e.g., the natural language generation system 104).

Subsequently, the second natural language output 114 can be provided to the large language model 102 for evaluation against various scoring criteria 116 in combination with a reinforcement learning protocol 118 that defines a reward model 120. As will be elaborated upon below, the scoring criteria 116 can enable the large language model 102 to assess various aspects of the second natural language output 114. For example, the scoring criteria 116 can configure the large language model 102 to evaluate various aspects of the second natural language output 114 such as a textual fluency parameter and an informativeness parameter. Accordingly, the large language model 102 can generate a feedback input 122 and an output score 124 via the reinforcement learning protocol 118. The feedback input 122 and the output score 124 may then be provided to the natural language generation system 104 to cause updates to various parameters.

The feedback input 122 generated by the large language model 102 can be a modification to policies that govern the behavior of the natural language generation system 104. For instance, in the context of a text summarization natural language generation task 108, a policy can define signifiers of important words and/or phrases bear mentioning in a summary generated by the natural language generation system 104. As such, the feedback input 122 can enable the large language model 102 to fine tune the natural language generation system 104 through many iterations such that the second natural language output 114 gradually aligns with the tendencies of the large language model 102.

In addition, the output score 124 can be a numerical metric that quantifies the evaluation of the second natural language output 114 against the scoring criteria 116. Accordingly, the reward model 120 of the reinforcement learning protocol 118 can configure the natural language generation system 104 to seek actions that maximize the output score 124. The reward model 120 can be trained on the feedback inputs 122 generated by the large language model 102 to provide a secondary layer of evaluation for the natural language generation system 104. In various examples, the reinforcement learning protocol 118 can utilize any suitable reinforcement learning methodologies such as policy gradients, proximal policy optimization, and the like. As such, the natural language generation system 104 can generate a third natural language output 126, which can be an iteration of the second natural language output 114 incorporating changes defined by the feedback inputs 122 with the aim of increasing the output score 124.

Figure 2:
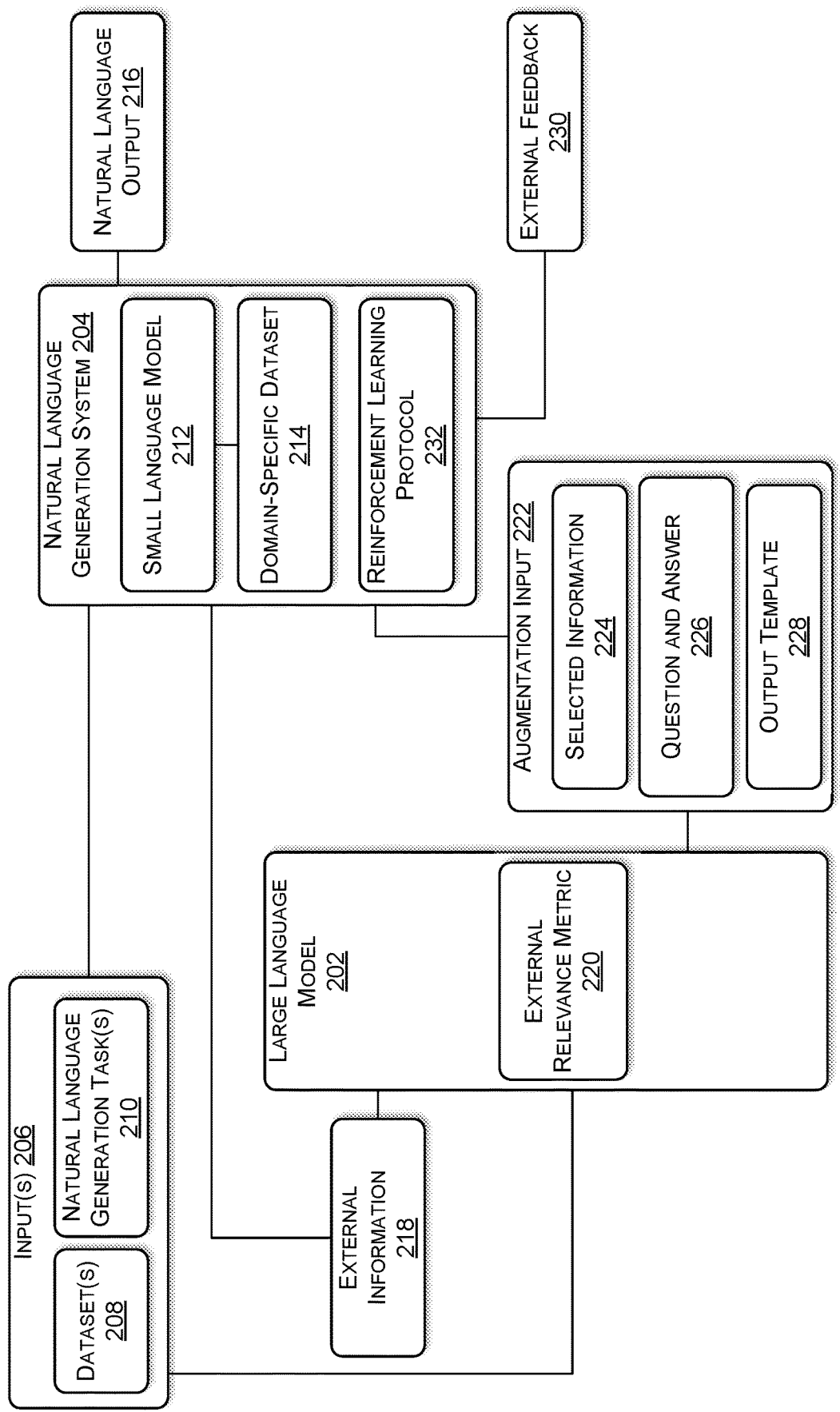
FIG. 2 is a block diagram of a system for augmenting a small language model with a large language model to perform natural language generation tasks.

Turning now to FIG. 2, a system 200 in which a large language model 202 is deployed to augment a natural language generation system 204 is shown and described. In contrast to the system 100 discussed above which can be primarily utilized in a model training context, the system 200 can be utilized in a live deployment environment. That is, external users can provide their own inputs 206 with new datasets 208 and natural language generation tasks 210 such as text summarization, conversation dialogue generation, query responses, and text synthesis. As such, the inputs 206 can contain data that the natural language generation system 204 may be unfamiliar with as opposed to the training datasets 106 discussed above with respect to FIG. 1.

As mentioned above, the natural language generation system 204 can utilize a small language model 212 which can be configured with a domain-specific dataset 214. In an illustrative example, the natural language generation system 204 can be deployed in a healthcare context (e.g., a hospital information technology system). Accordingly, the domain-specific dataset 214 can be information that is specific to the healthcare context such as patient records, treatment protocols, and internal processes. Due to the smaller size of the small language model 212 relative to the large language model 202, the small language model 212 can benefit from improved adaptability to various contexts. However, small language models 212 can suffer from inferior language understanding and generation quality compared to a large language model 202. As such, by augmenting a natural language generation system 204 with a large language model 202, the system 200 can retain the specialized performance of small language models 212 while improving language understanding and generation capabilities for natural language outputs 216.

In various examples, the system 200 can receive an input 206 containing a dataset 208 and a natural language generation task 210. In a specific example, the dataset 208 can be a research paper while the natural language generation task 210 can be a text summarization task. To augment the input 206, the large language model 202 can retrieve external information 218 based on an external relevance metric 220. The external relevance metric 220 can define a level of relevance for various pieces of external information 218 to the dataset 208 of the input 206. For instance, the dataset 208 can be a research publication of a clinical trial for a new pharmaceutical. Accordingly, external information 218 with a high external relevance metric 220 can be other publications relating to the new pharmaceutical (e.g., dosages, ingredients, intended use).

From an analysis of the external information 218, the large language model 202 can generate an augmentation input 222. The augmentation input 222 can include selected information 224 derived from the external information 218. Continuing with the example of the research publication of a clinical trial for the new pharmaceutical, the selected information 224 can include findings from other clinical trials, information about the manufacturer, and so forth. In this way, the selected information can provide context to the natural language generation system 204 and lead to a robust natural language output 216. Consequently, the system 200 can leverage the language comprehension capabilities of the large language model 202 in various scenarios without incurring the heavy processing loads and latencies associated with a large language model 202.

In another example, the augmentation input 222 can include a question and answer 226 regarding the dataset 208 and/or the external information 218. The question and answer 226 can comprise various predetermined queries that the large language model 202 can answer using the dataset 208 and/or the external information 218 such as notable people, specific information, and the like. In addition to the selected information 224, the question and answer 226 can provide further context regarding the dataset 208 and/or the external information 218. In contrast to the selected information 224 however, the question and answer 226 can provide specificity with a structured format whereas the selected information 224 can be formatted as a general overview.

In still another example, the augmentation input 222 can include an output template 228 as another option for structuring information instead of, or in combination with, the selected information 224 and the question and answer 226. In various examples, the output template 228 can define a predetermined structure that the small language model 212 of the natural language generation system 204 can adhere to when generating the natural language output 216. Moreover, the output template 228 can be generated by the large language model 202 based on the natural language generation task 210. For instance, the natural language generation task 210 can be a text generation task for synthesizing information from various sources. Accordingly, the output template 228 can be a form that defines specific spaces which the small language model 212 can fill in information in accordance with the natural language generation task 210. As such, the output template 228 can reduce the amount of information the small language model 212 must generate thereby enhancing the efficiency of the system 200.

The augmentation input 222 can subsequently be provided to the natural language generation system 204 to configure the small language model 212 with contextual parameters. In this way, the augmentation input 222 supplements the domain-specific dataset 214 to enhance language understanding as well as the quality of the natural language output 216. Similar to the system 100 discussed above, the augmentation input 222 provided by the large language model 202 can improve the informativeness, coherence, fluency, and other language characteristics of the natural language output 216, which can typically suffer in applications of small language models. Therefore, the system 200 can reap the benefits of deep language understanding and high quality generation from the large language model 202 while retaining the adaptability and resource efficiency inherent to the small size of small language models.

Furthermore, the natural language system 204, as an external user facing component of the system 200, can receive external feedback 230. In various examples, the external feedback 230 can include a numerical score for various aspects of the natural language output 216 such as readability, coherence, and language fluency. The external feedback 230 can be processed as part of a reinforcement learning protocol 232 to enable the natural language generation system 204 to improve the quality of the small language model 212 over time. Leveraging human feedback further enhances the quality of the natural language outputs 216 without compromising adaptability and resource efficiency.

Figure 3:
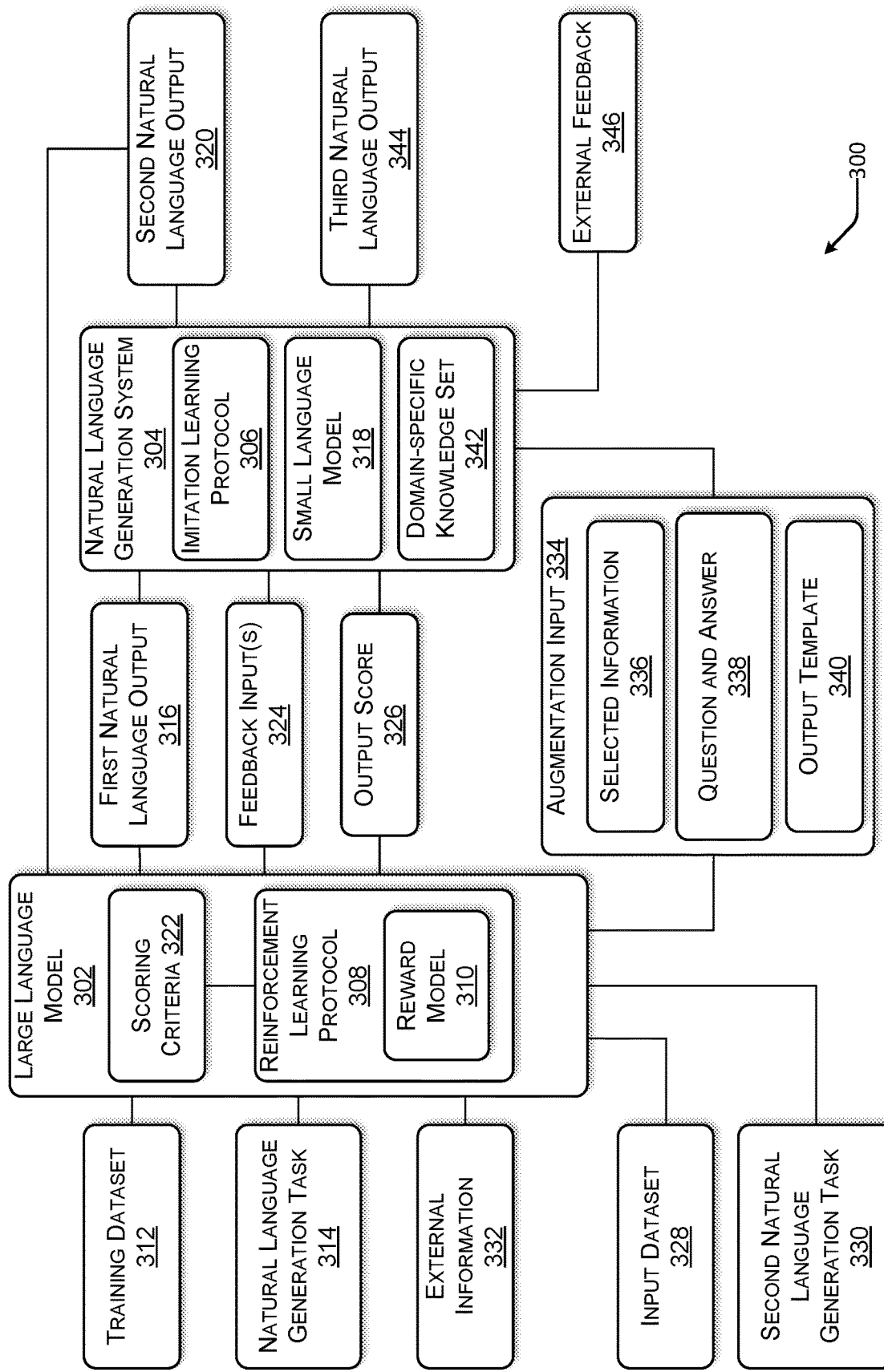
FIG. 3 is a block diagram of a system for training and augmenting a natural language generation system using a large language model.

Proceeding to FIG. 3, a system 300 in which a large language model 302 trains and augments a natural language generation system 304 is shown and described. As mentioned above, a large language model 302 can be utilized to train a natural language system 304 through an imitation learning protocol 306 and a reinforcement learning protocol 308 defining a reward model 310. Training the natural language generation system 304 can utilize a training dataset 312 comprising a large corpus of unlabeled data and a natural language generation task 314 that are provided to the large language model 302. In various examples, the natural language generation task 314 can be formatted as a plain language prompt (e.g., "summarize half of the training dataset.") In response, the large language model 302 can generate a first natural language output 316 accomplishing the natural language generation task 314.

A small language model 318 at the natural language generation system 304 can be subsequently configured with the training dataset 312, the first natural language output 316, and the natural language generation task 314. Based on the imitation learning protocol 306, the small language model 318 generates a second natural language output 320 that mimics the first natural language output 316 produced by the large language model 302. The second natural language output 320 can then be returned to the large language model 302 for evaluation against various scoring criteria 322 (e.g., an informativeness parameter, a coherence parameter, a fluency parameter).

Based on the evaluation of the scoring criteria 322, the large language model 302 can generate various feedback inputs 324 that modify various aspects of the small language model 318 to align the small language model 318 with the tendencies of the large language model 302. Moreover, the reward model 310 of the reinforcement learning protocol 308 can generate an output score 326 that quantifies the quality of the second natural language output 320 in light of the scoring criteria 322. In addition, the reward model 310 can configure the small language model 318 to seek actions (e.g., the second natural language output 320) that maximize the output score 326. Over many iterations of modifying the second natural language output 320 and feedback inputs 324, the small language model 318 may reach an output score 326 that satisfies a threshold output score. In response, the system 300 can determine that the small language model 318 has achieved a satisfactory level of performance and can begin receiving new inputs (e.g., from external users).

Consequently, the large language model 302 can transition from training the small language model 318 to augmenting the natural language generation system 304 in a live deployment context. Accordingly, the system 300 can receive an input dataset 328 and a second natural language generation task 330. The input dataset 328 can differ from the training dataset 312 in that the input dataset 328 can include data that has not been previously analyzed by the small language model 318 of the natural language generation system 304.

Based on the input dataset 328, the large language model 302 can additionally retrieve pieces of external information 332 which can be utilized by the large language model 302 to generate an augmentation input 334. As mentioned above, the augmentation input 334 can include selected information 336 derived from the input dataset 328 and/or the external information 332 such as key facts, excerpts, statistics, and the like. In addition, the augmentation input 334 can include formats to structure pieces of information such as the question and answer 338. The question and answer 338 can include predetermined queries regarding the input dataset 328 and/or the external information 332. These predetermined queries can lead the large language model 302 to surface specific pieces of information in the form of an answer to question. Similarly, the augmentation input 334 can include an output template 340. In various examples, the output template 340 can define a predetermined structure which the small language model 318 can fill in with information as directed by the output template 340.

Using the augmentation input 334, in addition to a domain-specific knowledge set 342, the natural language generation system 304 can process the input dataset 328. Accordingly, the small language model 318 can generate a third natural language output 344 corresponding to the second natural language generation task 330. In various examples, the third natural language output 344 can be provided to the external source and/or user that provided the input dataset 328 and the second natural language generation task 330. The external source and/or user can subsequently provide external feedback 346 rating various aspects of the third natural language output 344 such as coherence, fluency, and so forth. The external feedback 346 can be analyzed by the natural language generation system 304 and/or the large language model 302 to modify various parameters to improve both augmentation and training over time.

Figure 4:
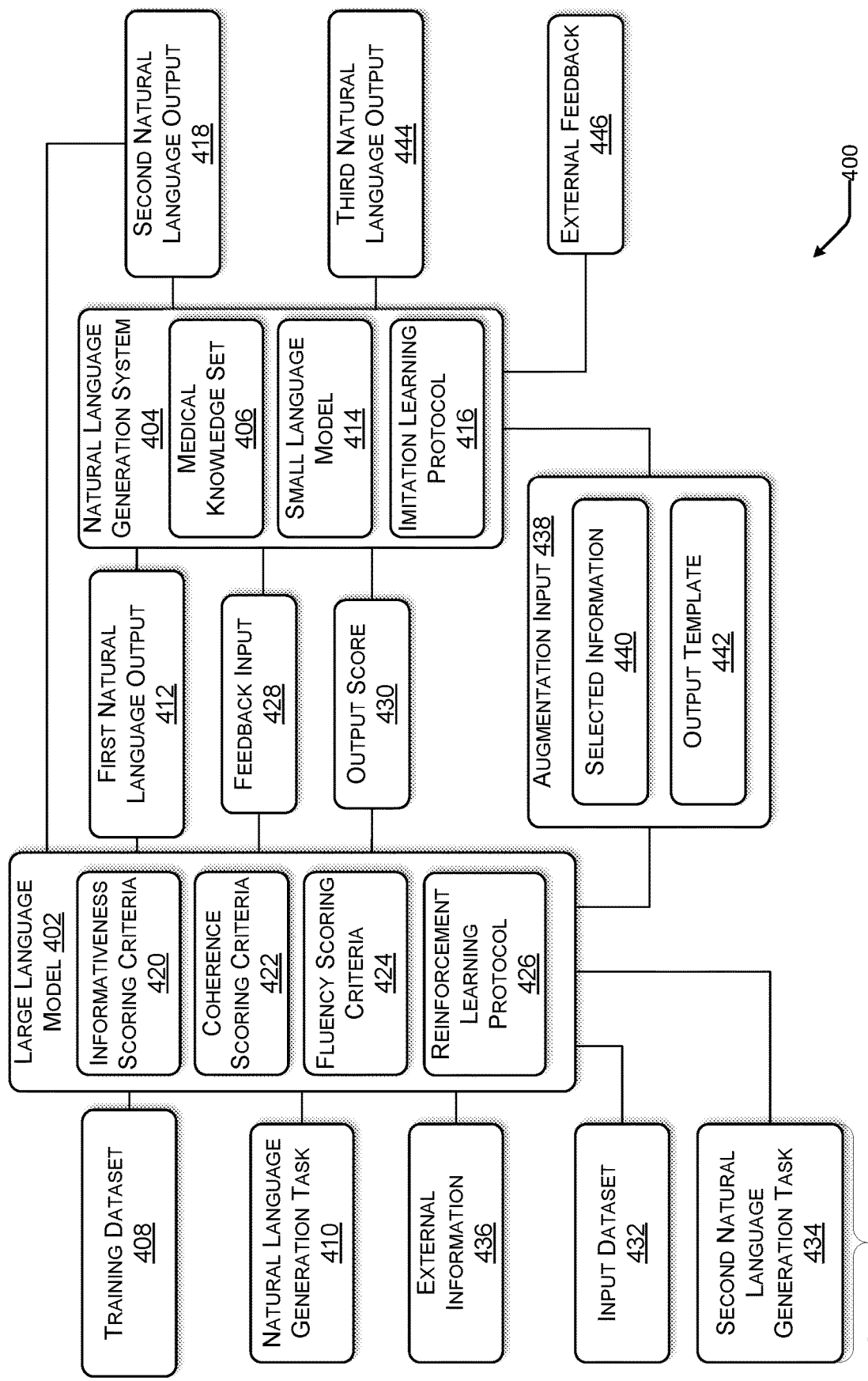
FIG. 4 is a block diagram of a system for training and augmenting a natural language generation system using a large language model deployed for utilization in an example context.

Turning now to FIG. 4, a system 400 in which a large language model 402 trains and augments a natural language generation system 404 in a medical information context is shown and described. In various examples, the system 400 can be part of an information technology infrastructure of a hospital for managing patient records, industry data, research publications, and the like. Accordingly, the natural language generation system 404 can be configured with a domain-specific medical knowledge set 406. The medical knowledge set 406 can contain data that is specific to the context of the system 400 such as the names of associated personnel, organizations, internal processes, and so forth.

To prepare the system 400 for use in the medical information context, the large language model 402 can receive a training dataset 408 comprising a large corpus of unlabeled data such as text, video, audio, and images. The large language model 402 can process the training dataset 408 in accordance with a natural language generation task 410. The natural language generation task 410 can be formatted as a plain language prompt configuring the large language model 402 to execute certain behaviors (e.g., "produce a summary of these research papers.") In response to the natural language generation task 410, the large language model 402 can generate a first natural language output 412. As discussed above, the first natural language output 412 can serve as a pseudo-label for the training dataset 408 demonstrating an expected behavior across various natural language generation tasks 410 such as text summarization, conversational dialogue generation, query responses, text synthesis, and so forth.

The first natural language output 412 can be accordingly provided to the natural language generation system 404 along with the training dataset 408 to train a small language model 414 using an imitation learning protocol 416. The small language model 414 can subsequently analyze the training dataset 408 in the context of the first natural language output 412 in order to learn behaviors across various natural language tasks such as summarization, dialogue generation, text synthesis, and the like. As such, the small language model 414 can produce a second natural language output 418 that mimics the first natural language output 412. The second natural language output 418 can then be returned to the large language model 402 for evaluation against various scoring criteria such as an informativeness scoring criteria 420, a coherence scoring criteria 422, and a fluency scoring criteria 424.

In various examples, the large language model 402 can select some scoring criteria parameters and not others when evaluating the second natural language output 418 based on the natural language generation task 410. For instance, a text summary natural language generation task 410 can be evaluated under all of the informativeness scoring criteria 420, coherence scoring criteria 422, and fluency scoring criteria 424. Meanwhile, a question and answer natural language task 410 can be evaluated under the informativeness scoring criteria 420 and not necessarily the coherence scoring criteria 422 and/or the fluency scoring criteria 424.

The evaluations of the large language model 402 can be subsequently processed by a reinforcement learning protocol 426 to generate a reward signal comprising a feedback input 428 and an output score 430. As discussed above, the feedback input 428 can cause the natural language generation system 404 to modify various parameters of the small language model 414 to better align subsequent iterations of the second natural language output 418 with the first natural language output 412. As such, the small language model 414 can acquire the natural language performance of the large language model 402 over time. Upon satisfying a threshold output score 430, the system 400 may determine that the small language model 414 has attained a satisfactory level of natural language performance for use in the medical information context mentioned above.

In response, the large language model 402 can transition from previous operations that train the small language model 414 to augmentation in the medical information context. Accordingly, the large language model 402 can receive an input dataset 432 and a second natural language generation task 434 from an external user (e.g., a doctor, a nurse technician). In a specific example, the input dataset 432 can be information gleaned from a patient consultation while the second natural language generation task 434 can be a plain language prompt instructing the system 400 to "generate a patient report for John Doe."

The large language model 402 can proceed to retrieve external information 436 that relates to the second natural language generation task 434 such as information on various medications, illnesses, treatment methods, form documents and so forth. Based on the input dataset 432 and the external information 436, the large language model 402 can generate an augmentation input 438 that can assist the natural language generation system 404 in executing the second natural language generation task 434. For instance, the augmentation input 438 can include selected information 440 derived from the external information 436 as well as an output template 442. In the context of generating a patient report, the output template 442 can be a standard patient report form that the small language model 414 can accordingly fill out using the medical knowledge set 406 in conjunction with the input dataset 432.

For instance, the medical knowledge set 406 can include patient data for the specific "John Doe" that the second natural language generation task 434 refers to such as treatment history, allergies to certain medications, and the like. The medical knowledge set 406 can differ from the external information 436 retrieved by the large language model 402 in terms of specificity. While the large language model 402 can be trained on data provided by the hospital of the present example, achieving granularity at the scale of individual patients may be impractical due to the size and complexity of the large language model 402. In contrast, the medical knowledge set 406 of the natural language generation system 404 can be updated and adapted with greater specificity.

In this way, the natural language generation system 404 can produce a third natural language output 444 comprising the patient report for John Doe as requested by the second natural language generation task 434. The third natural language output 444 can accordingly be provided to the external user. In response, the natural language generation system 404 can receive external feedback 446 rating various aspects of the third natural language output 444 such as coherence, language fluency and so forth. The natural language generation system 404 can subsequently use the external feedback 446 to adjust various parameters of the small language model 414 and/or the medical knowledge set 406 to further improve the quality of the third natural language output 444.

Figure 5:
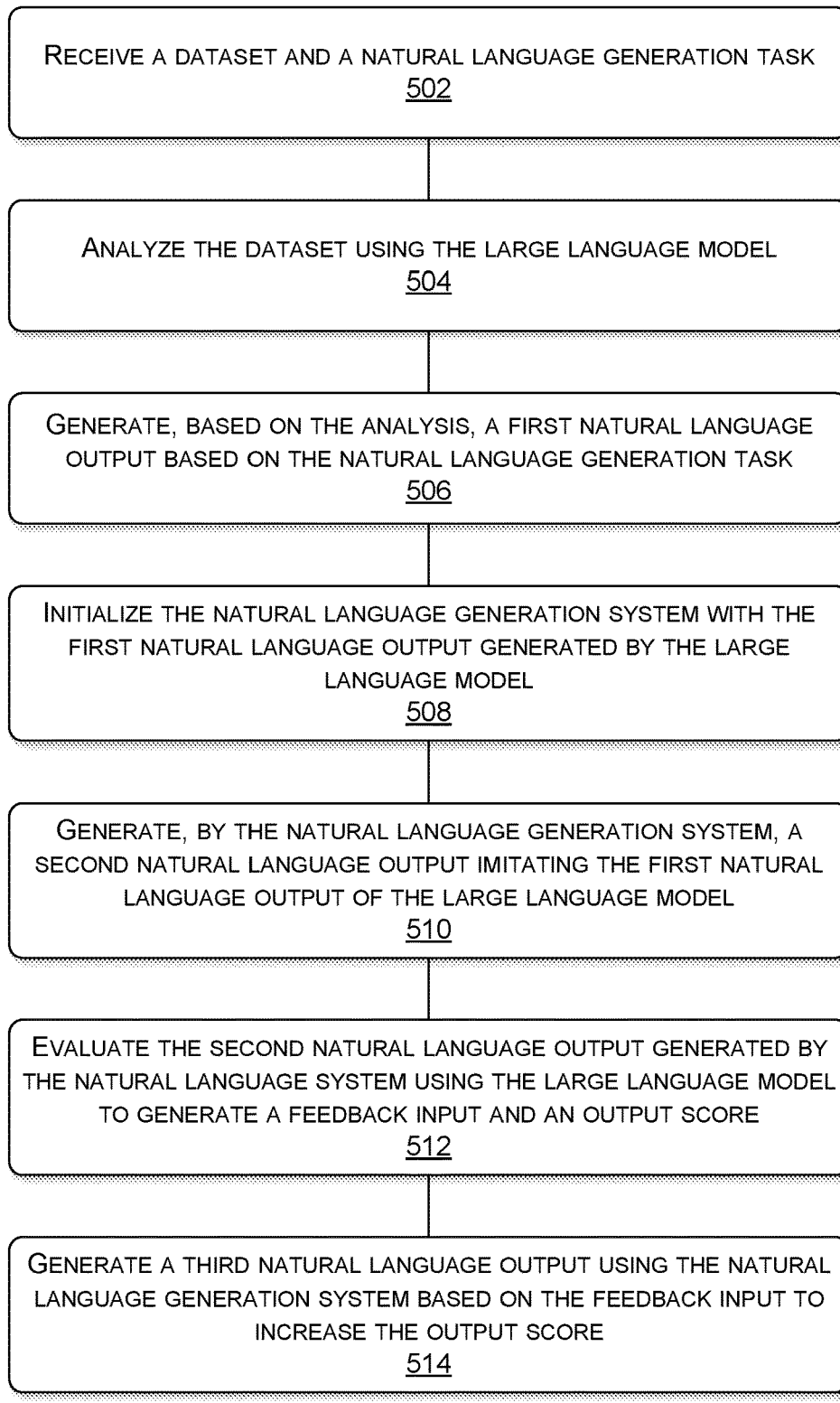
FIG. 5 is a flow diagram showing aspects of a routine for training a natural language generation system using a large language model.

Proceeding to FIG. 5, aspects of a routine 500 for performing natural language training using a large language model are shown and described. With reference to FIG. 5, the routine 500 begins at operation 502 where a system receives a dataset and a natural language generation task.

Next, at operation 504, the system analyzes the dataset using the large language model.

Then, at operation 506, the system generates a first natural language output based on the natural language generation task.

Next, at operation 508, the system initializes the natural language generation system with the first natural language output generated by the large language model.

Subsequently, at operation 510, the system generates a second natural language output imitating the first natural language output of the large language model using the natural language generation system.

Then, at operation 512, the system evaluates the second natural language output generated by the natural language system using the large language model to generate a feedback input and an output score.

Finally, at operation 514, the system generates a third natural language output using the natural language generation system based on the feedback input to increase the output score.

Figure 6:
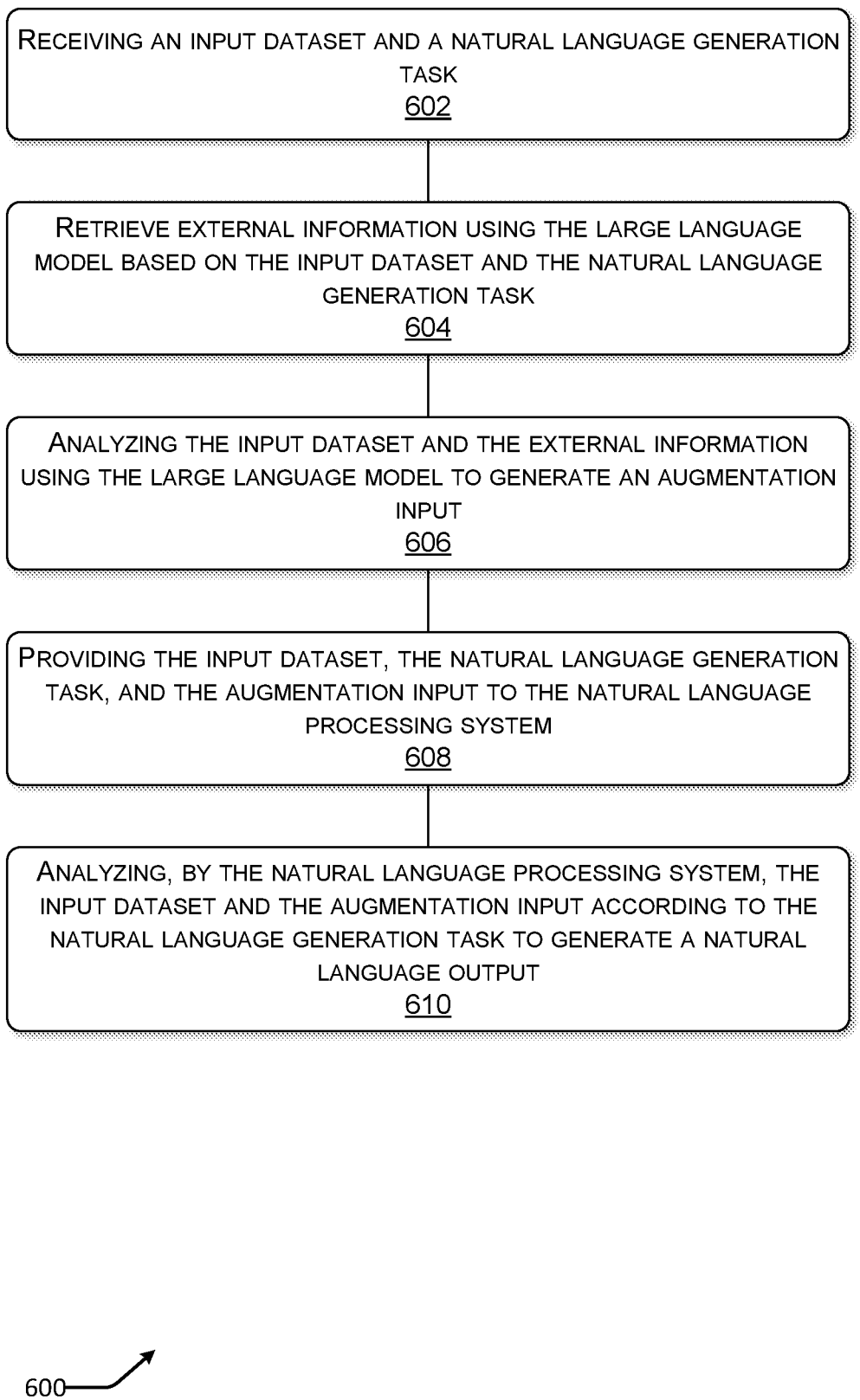
FIG. 6 is a flow diagram showing aspects of a routine for augmenting a natural language generation system using a large language model.

Turning now to FIG. 6, aspects of a routine 600 for performing natural language training using a large language model are shown and described. With reference to FIG. 6, the routine 600 begins at operation 602 where a system receives an input dataset and a natural language generation task.

Next, at operation 604, the system retrieves external information using the large language model based on the input dataset and the natural language generation task.

Then, at operation 606, the system analyzes the input dataset and the external information using the large language model to generate an augmentation input.

Subsequently, at operation 608, the system provides the input dataset, the natural language generation task, and the augmentation input to the natural language processing system.

Finally at operation 610, the system analyzes, by the natural language processing system, the input dataset and the augmentation input according to the natural language generation task to generate a natural language output.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted. In addition, the operations of the routine 500 and/or 600 may also be performed interchangeably and/or simultaneously (e.g., as discussed above with respect to FIG. 3 and/or FIG. 4).

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 and/or 600 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 and/or 600 may also be implemented in other ways. In addition, one or more of the operations of the routine 500 and/or 600 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 7:
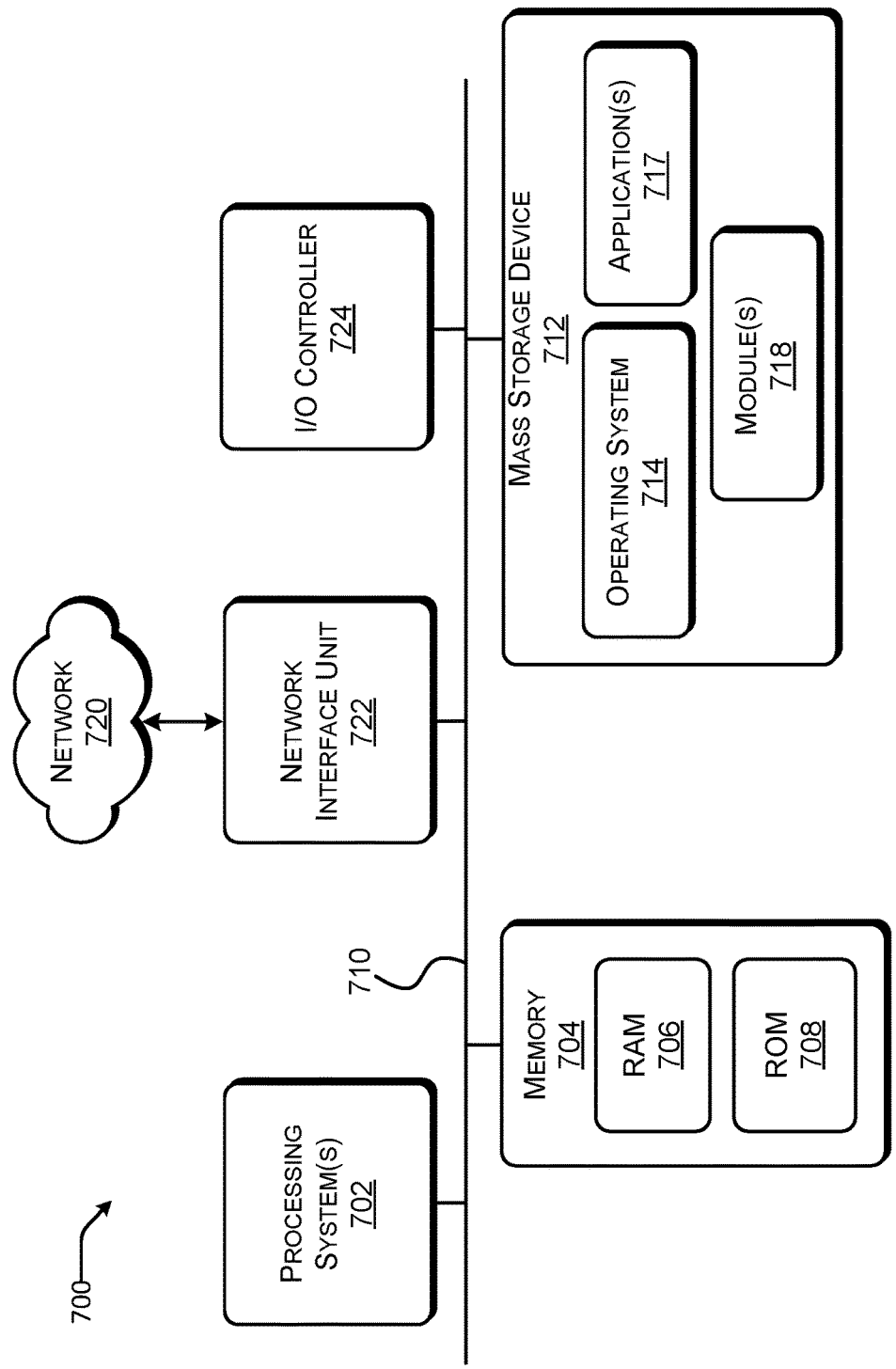
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the cloud-based platform or systems 100, 200, 300, 400 capable of executing computer instructions (e.g., a module or a program component described herein). The computer architecture 700 illustrated in FIG. 7 includes processing system 702, a system memory 704, including a random-access memory 706 (RAM) and a read-only memory (ROM) 708, and a system bus 710 that couples the memory 704 to the processing system 702. The processing system 702 comprises processing unit(s). In various examples, the processing unit(s) of the processing system 702 are distributed. Stated another way, one processing unit of the processing system 702 may be located in a first location (e.g., a rack within a datacenter) while another processing unit of the processing system 702 is located in a second location separate from the first location.

Processing unit(s), such as processing unit(s) of processing system 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing system 702 through a mass storage controller connected to the bus 710. The mass storage device 712 and its associated computer-readable media provide non-volatile storage for the computer architecture 700. Although the description of computer-readable media contained herein refers to a mass storage device, the computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen.

Similarly, the input/output controller 724 may provide output to a display screen, a printer, or other type of output device.

The software components described herein may, when loaded into the processing system 702 and executed, transform the processing system 702 and the overall computer architecture 700 from a general-purpose computing system into a special-purpose computing system customized to facilitate the functionality presented herein. The processing system 702 may be constructed from any number of transistors or other discrete circuit elements, which may individually or collectively assume any number of states. More specifically, the processing system 702 may operate as a finite-state machine, in response to executable instructions contained within the software modules disclosed herein. These computer-executable instructions may transform the processing system 702 by specifying how the processing system 702 transition between states, thereby transforming the transistors or other discrete hardware elements constituting the processing system 702.

Figure 8:
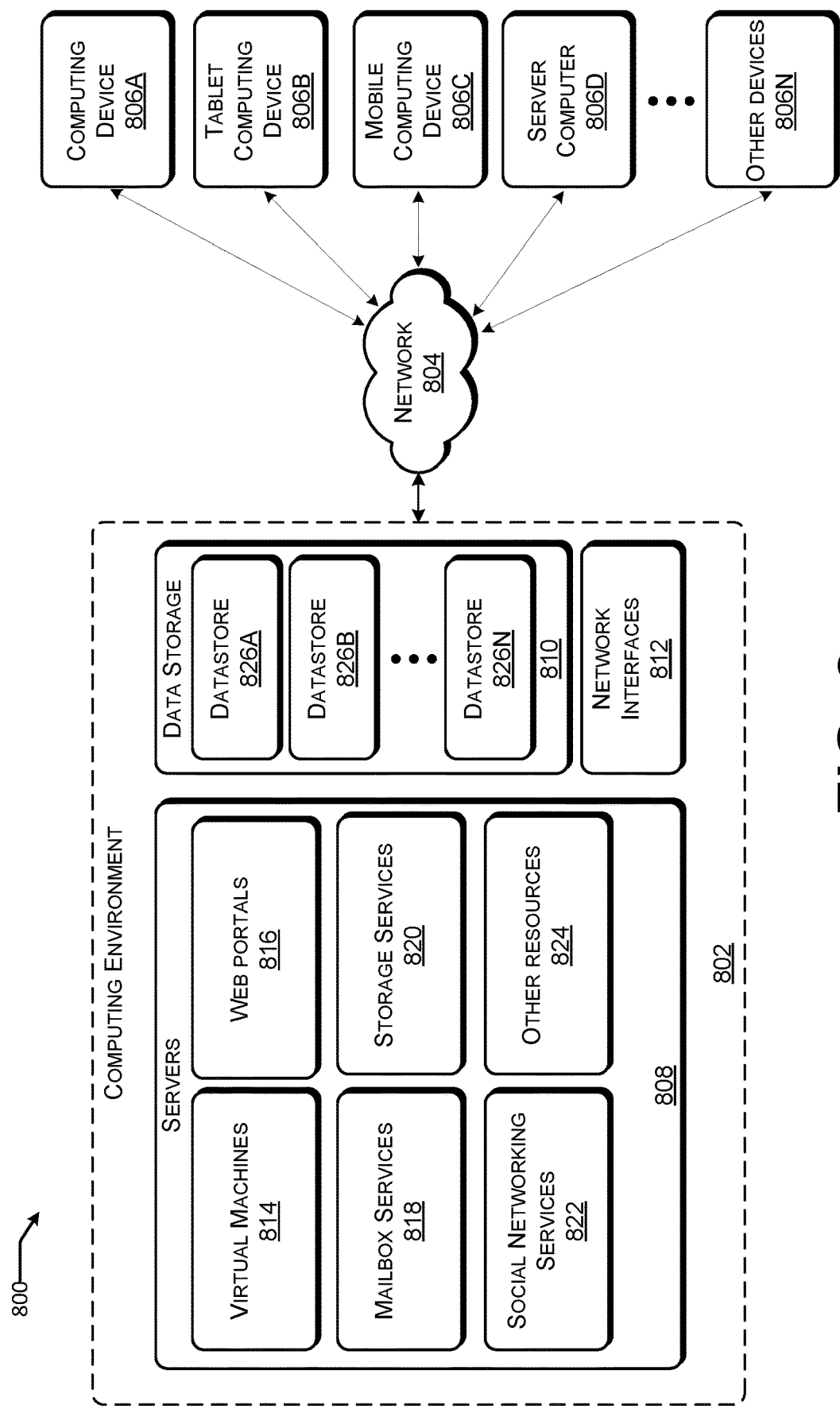
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein. Accordingly, the distributed computing environment 800 can include a computing environment 802 operating on, in communication with, or as part of the network 804. The network 804 can include various access networks. One or more client devices 806A-806N (hereinafter referred to collectively and/or generically as "computing devices 806") can communicate with the computing environment 802 via the network 804. In one illustrated configuration, the computing devices 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of computing devices 806 can communicate with the computing environment 802.

In various examples, the computing environment 802 includes servers 808, data storage 610, and one or more network interfaces 812. The servers 808 can host various services, virtual machines, portals, and/or other resources. In the illustrated configuration, the servers 808 host virtual machines 814, Web portals 816, mailbox services 818, storage services 820, and/or social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 can also be provided by one or more servers configured to host data for the computing environment 800. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein also encompasses the subject matter set forth in the following clauses.

Example Clause A, a method for training a natural language generation system using a large language model comprising: receiving a dataset and a natural language generation task; analyzing the dataset using the large language model; generating, based on the analyzing a first natural language output based on the natural language generation task; initializing the natural language generation system with the first natural language output generated by the large language model; generating, by the natural language generation system, a second natural language output imitating the first natural language output of the large language model; evaluating the second natural language output generated by the natural language system using the large language model to generate a feedback input and an output score; and generating a third natural language output using the natural language generation system based on the feedback input to increase the output score.

Example Clause B, the method of Example Clause A, wherein the natural language generation system is initialized using an imitation learning protocol based on collected demonstrations from the large language model.

Example Clause C, the method of claim Example Clause A, wherein the natural language generation task is text summarization.

Example Clause D, the method of claim Example Clause A, wherein the natural language generation task is conversational dialogue.

Example Clause E, the method of claim Example Clause A, wherein the natural language generation task is a query response.

Example Clause F, the method of any one of Example Clause A through E, wherein evaluating the second natural language output generated by the natural language system comprises: selecting a scoring criteria based on the natural language generation task, wherein the scoring criteria includes at least one of a natural language fluency parameter, an informativeness parameter, or a coherence parameter; and generating the output score according to the scoring criteria.

Example Clause G, the method of Example Clause F, further comprising selecting the scoring criteria based on a type of the natural language generation task.

Example Clause H, a method for augmenting a natural language generation system using a large language model comprising: receiving an input dataset and a natural language generation task; retrieving external information using the large language model based on the input dataset and the natural language generation task; analyzing the input dataset and the external information using the large language model to generate an augmentation input; providing the input dataset, the natural language generation task, and the augmentation input to the natural language processing system; and analyzing, by the natural language processing system, the input dataset and the augmentation input according to the natural language generation task to generate a natural language output.

Example Clause I, the method of Example Clause H, further comprising: receiving external feedback based on the natural language output; and modifying the natural language generation system based on the received feedback.

Example Clause J, the method of Example Clause H or Example Clause I, wherein the natural language generation system is configured with a domain-specific knowledge set.

Example Clause K, the method of any one of Example Clause H through J, wherein the external information comprises supplementary information that is selected by the large language model based on a relevance to the input dataset.

Example Clause L, the method of any one of Example Clause H through K, wherein the augmentation input comprises a natural language output template.

Example Clause M, the method of any one of Example Clause H through K, wherein the augmentation input comprises a selected information that is extracted from the input dataset by the large language model based on the natural language generation task.

Example Clause N, the method of any one of Example Clause H through M, wherein natural language generation task is text summarization.

Example Clause O, a method for training and augmenting a natural language generation system using a large language model comprising: receiving a training dataset and a first natural language generation task; analyzing the training dataset using the large language model; generating, based on the analyzing, a first natural language output based on the natural language generation task; initializing the natural language generation system with the first natural language output generated by the large language model; generating, by the natural language generation system, a second natural language output imitating the first natural language output of the large language model; evaluating the second natural language output generated by the natural language system using the large language model to generate a feedback input and an output score; generating a modified second natural language output using the natural language generation system based on the feedback input to increase the output score; receiving an input dataset and a second natural language generation task; retrieving external information using the large language model based on the input dataset and the natural language generation task; analyzing the input dataset and the external information using the large language model to generate an augmentation input; providing the input dataset, the second natural language generation task, and the augmentation input to the natural language processing system; and analyzing, by the natural language processing system, the input dataset and the augmentation input according to the second natural language generation task to generate a third natural language output.

Example Clause P, the method of Example Clause O, wherein evaluating the second natural language output generated by the natural language system comprises: selecting a scoring criteria based on the first natural language generation task; and generating the output score according to the scoring criteria.

Example Clause Q, the method of Example Clause P, wherein: the scoring criteria is natural language fluency; and the output score is a fluency score.

Example Clause R, the method of any one of Example Clause O through Q, wherein the natural language generation system is configured with a domain-specific knowledge set.

Example Clause S, the method of any one of Example Clause O through R, wherein the augmentation input comprises a selected information that is extracted from the input dataset by the large language model based on the second natural language generation task.

Example Clause T, the method of any one of Example Clause O through R, wherein the augmentation input comprises a natural language output template.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different natural language outputs).

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

It is claimed:

1. A method for training a natural language generation system using a large language model comprising:
   receiving a dataset and a natural language generation task that is associated with a domain;
   analyzing the dataset using the large language model;
   generating, based on the analyzing, a first natural language output based on the natural language generation task;
   initializing a small language model of the natural language generation system with the first natural language output generated by the large language model, wherein the small language model of the natural language generation system is configured with a knowledge set specific to the domain;
   generating, by the small language model of the natural language generation system, a second natural language output imitating the first natural language output of the large language model;
   evaluating the second natural language output generated by the small language model of the natural language generation system using the large language model to generate a feedback input and an output score; and
   generating a third natural language output using the small language model of the natural language generation system based on the feedback input to increase the output score.

2. The method of claim 1, wherein the small language model of the natural language generation system is initialized using an imitation learning protocol based on collected demonstrations from the large language model.

3. The method of claim 2, wherein the collected demonstrations comprise expected behavior related to the domain.

4. The method of claim 1, wherein the natural language generation task is text summarization.

5. The method of claim 1, wherein the natural language generation task is conversational dialogue.

6. The method of claim 1, wherein the natural language generation task is a query response.

7. The method of claim 1, wherein evaluating the second natural language output generated by the small language model of the natural language system comprises:
   selecting a scoring criteria based on the natural language generation task, wherein the scoring criteria includes at least one of a natural language fluency parameter, an informativeness parameter, or a coherence parameter; and
   generating the output score according to the scoring criteria.

8. The method of claim 7, further comprising selecting the scoring criteria based on a type of the natural language generation task.

9. A method for augmenting a natural language generation system using a large language model comprising:
   receiving an input dataset and a natural language generation task associated with a domain;
   retrieving external information using the large language model based on the input dataset and the natural language generation task, wherein the external information is selected by the large language model based on a relevance to the input dataset;
   analyzing the input dataset and the external information using the large language model to generate an augmentation input;
   providing the input dataset, the natural language generation task, and the augmentation input to the natural language generation system; and
   analyzing, by a small language model of the natural language generation system, the input dataset and the augmentation input according to the natural language generation task to generate a natural language output, wherein the small language model of the natural language generation system is configured with a knowledge set specific to the domain.

10. The method of claim 9, further comprising:
    receiving external feedback based on the natural language output; and
    modifying the natural language generation system based on the received external feedback.

11. The method of claim 9, wherein the augmentation input comprises a natural language output template.

12. The method of claim 9, wherein the augmentation input comprises selected information that is extracted from the input dataset by the large language model based on the natural language generation task.

13. The method of claim 9, wherein the natural language generation task is text summarization.

14. A method for training and augmenting a natural language generation system using a large language model comprising:
    receiving a training dataset and a first natural language generation task associated with a domain;
    analyzing the training dataset using the large language model;
    generating, based on the analyzing, a first natural language output based on the natural language generation task;
    using an imitation learning protocol based on collected demonstrations from the large language model to initialize the natural language generation system with the first natural language output generated by the large language model;
    generating, by a small language model of the natural language generation system, a second natural language output imitating the first natural language output of the large language model, wherein the small language model of the natural language generation system is configured with a knowledge set specific to the domain;
    evaluating the second natural language output generated by the small language model of the natural language generation system using the large language model to generate a feedback input and an output score;
    generating a modified second natural language output using the small language model of the natural language generation system based on the feedback input to increase the output score;
    receiving an input dataset and a second natural language generation task associated with the domain;
    retrieving external information using the large language model based on the input dataset and the second natural language generation task, wherein the external information is selected by the large language model based on a relevance to the input dataset;

analyzing the input dataset and the external information using the large language model to generate an augmentation input;

providing the input dataset, the second natural language generation task, and the augmentation input to the natural language generation system; and analyzing, by the small language model of the natural language generation system, the input dataset and the augmentation input according to the second natural language generation task to generate a third natural language output.

15. The method of claim 14, wherein evaluating the second natural language output generated by the natural language generation system comprises:

selecting a scoring criteria based on the first natural language generation task; and generating the output score according to the scoring criteria.

16. The method of claim 15, wherein:

the scoring criteria is natural language fluency; and the output score is a fluency score.

17. The method of claim 14, wherein the augmentation input comprises selected information that is extracted from the input dataset by the large language model based on the second natural language generation task.

18. The method of claim 14, wherein the augmentation input comprises a natural language output template.

19. The method of claim 14, wherein the collected demonstrations comprise expected behavior related to the domain.

* * * * *